United States Patent [19]
Corbin

[11] 3,929,104
[45] Dec. 30, 1975

[54] LIVESTOCK UNLOADING AND TREATING TRAILER ASSEMBLY

[76] Inventor: Dean L. Corbin, 1349 Prospect, Blair, Nebr. 68008

[22] Filed: Apr. 1, 1974

[21] Appl. No.: 456,751

[52] U.S. Cl. ............................ 119/82; 119/99
[51] Int. Cl.² ................................. A01K 29/00
[58] Field of Search ............ 119/82, 98, 99; 280/30

[56] References Cited
UNITED STATES PATENTS

| | | | |
|---|---|---|---|
| 377,519 | 2/1888 | Ferguson | 119/82 |
| 1,458,996 | 6/1923 | Siglin | 119/82 |
| 1,679,945 | 8/1928 | Rieder | 119/82 |
| 3,020,882 | 2/1962 | Browning | 119/82 |

*Primary Examiner*—J. N. Eskovitz

[57] ABSTRACT

A livestock unloading and treating trailer assembly comprising a ramp having an inclined floor and having sidewalls, access openings in one or more of the sidewalls to permit treatment personnel to enter behind an animal which latter is at the lower end of the ramp with its head secured in a headgate, and an outer support with respect to which the ramp is adjustable to different inclinations.

8 Claims, 10 Drawing Figures

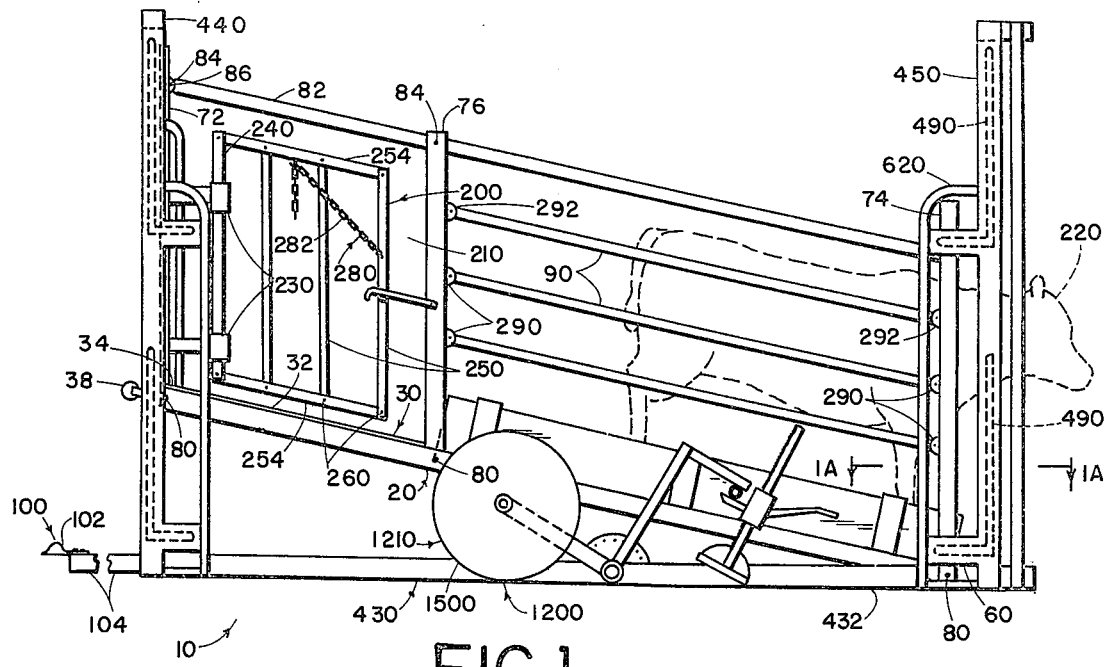
FIG. 1
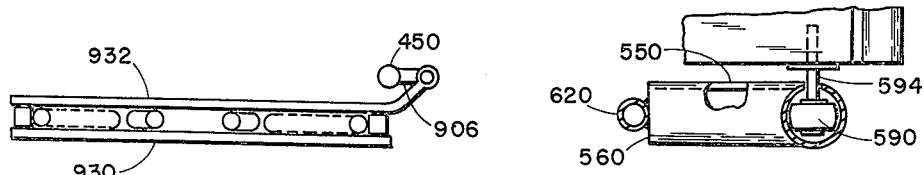
FIG. 2
FIG. 1A
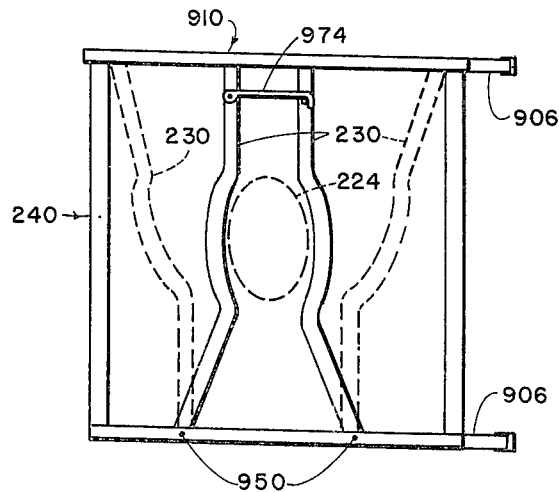
FIG. 3
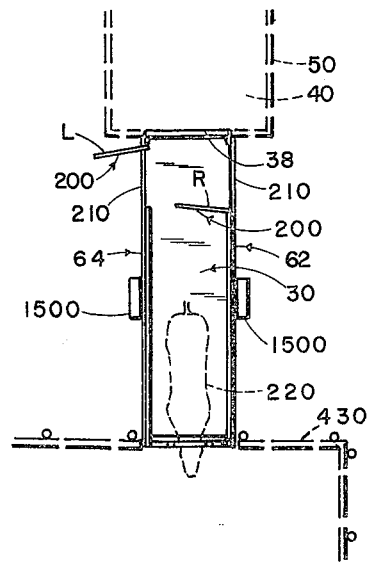
FIG. 4

LIVESTOCK UNLOADING AND TREATING TRAILER ASSEMBLY

FIELD OF THE INVENTION

This invention is in the field of livestock unloading chutes which are commonly used behind trucks so that cattle can move down the inclined chute for unloading. This invention is also in the field of devices for confining cattle and other animals at times when their heads are held in headgates, these latter devices being usually of 6-foot to 7-foot length, whereas unloading chutes are of a length of over 11 feet.

DESCRIPTION OF THE PRIOR ART

In the prior art there has never been an inclined livestock unloading trailer with a ramp of a length of over 11 feet so as to be sufficient for unloading cattle from a truck, and which is also provided with a headgate at its lower end for holding an animal alongside its neck to prevent the animal from moving forwardly or rearwardly while being treated.

This invention further provides one or more sidewall access doors to allow persons treating an animal in the chute to enter and leave the interior of the chute.

Heretofore the holding of animals in headgates for treatment has been done only as a separate operation from unloading and has only been done either in stationary holding stanchions, or else in short 6-foot to 7-foot treatment trailers provided with headgates. But such short treatment trailers lack the possibility of providing my idea of a long inclined ramp down which animals can move from a truck one-by-one to be headgated and treated on the ramp itself before being turned loose into a corral.

The short prior art "treatment trailers", usually of 6-foot to 7-foot length, have not been long enough to stretch from a truck bed down to the ground at an angle suitable for unloading of livestock from a truck. They have been used very little for livestock transport and their wheels have been chiefly so that the short treatment trailers are themselves mobile, as is the purpose of the wheel of the unloading and treatment chute of this invention.

A further objective is to provide an unloading and treatment chute that has an outer frame with respect to which an inner ramp is movable to different inclinations for adjustment to truck beds of different heights, the outer frame being ground-supported for stability during ramp raising by provision for moving wheels to non-supporting positions.

A sturdiness is provided by having the ramp and its sidewalls guided by track and track-follower means, which latter are made especially practical by provision for pivoting of ramp sidewall post members with respect to a ramp floor and also with respect to sidewall longitudinal members, the latter pivoting feature also making use of an upright headgate assembly practical.

SUMMARY OF THE INVENTION

The livestock unloading and treating trailer assembly comprises an elongated ramp having an inclined floor of a length of at least 11 feet so as to be sufficient for unloading livestock from truck beds, the ramp having right and left sidewalls, at least one of which is provided with an access opening therethrough to permit treatment personnel to pass therethrough so as to be able to stand on the ramp floor behind an animal when the animal is at the lower end of the ramp with its head secured in the headgate.

The trailer of this invention is in further combination with an outer support having lowermost portions disposed in a horizontal plane and restable on a horizontal supporting surface at times when the ramp floor surface is inclined with respect to the horizontal, the outer support comprising two pairs of posts at opposite ends of the ramp, each pair comprising one post on each side of the ramp, the outer support having means slidably supporting the lower end of the ramp in a manner permitting the ramp to move endwise of itself and also to move with respect to the outer support so that the ramp while remaining in the outer support can be moved to a selected one of various inclinations while the upper end of the ramp floor remains in a vertical plane.

The trailer of this invention has construction further characterized in that the posts have tracks thereon and the ramp is attached to the tracks by track follower means, the tracks guiding upward movement of the upper end of the ramp in a vertical plane during endwise movement of the ramp.

Both sidewalls of the ramp have access openings therethrough so that personnel can go through the sidewalls at times when the lower end of the chute assembly is disposed closing an opening in a confinement pen whereby the chute is in the way of movement of personnel from one side of the chute and truck to another side of the chute and truck whenever the chute is mounted on the back of a truck.

The livestock trailer of this invention further comprises wheel means for upholding the outer support whereby the chute can be transported, the wheel means being retractably and movably mounted on the outer support and being movable from storage positions in which the wheels do not uphold the outer support to wheeling positions for road travel in which the wheels do uphold the outer support.

The livestock trailer described further has a tongue and is useful on the highway, although it can be used with its ramp horizontal as a holding chute.

A particular object is to provide the trailer with track means having horizontal portions at each of its ends whereby either the forward or rearward end of the chute can be raised so that the chute can be inclined in either direction, as desired.

BRIEF DESCRIPTION OF THE DRAWING

FIG. 1 is a side elevation of the livestock unloading and treating trailer or chute assembly of this invention with an animal shown therein in dotted lines with other parts of a tongue being broken away, the position of slots of a track assembly means being shown in dotted lines. In FIG. 1 the wheels are disposed in a retracted position so that the outer frame rests on the ground.

FIG. 1A is a sectional view taken along the line 1A—1A of FIG. 1 and showing a broken away portion of the ramp, the transverse section of a track assembly being shown with a portion of its surface broken away for revealing a slot on its inner side.

FIG. 2 is a top plan view of a swingably mounted headgate assembly shown in detail, dotted lines showing open positions of neck confinement bars of the headgate assembly.

FIG. 3 is an end elevation of the headgate assembly of FIG. 2 as it would be seen from the underside in FIG. 2, or in other words, also, as it would be seen from the right end of the unloading and treatment chute assembly of FIG. 1.

FIG. 4 is a diagrammatic view showing the livestock unloading and treatment chute or trailer of this invention disposed between a confinement pen and a truck bed, the pen and bed both being shown in dotted lines, an animal being shown in FIG. 4 in the headgate at the lower end of the ramp.

DESCRIPTION OF THE PREFERRED EMBODIMENT

Figure 6:
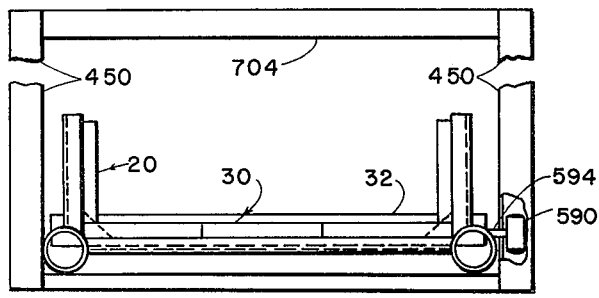
FIG. 6 is a sectional view taken along the line 6—6 of FIG. 5, except that it also shows the uppermost ends of posts and a connecting bar connecting the upper ends of a pair of posts.

The livestock unloading and treating chute assembly or livestock trailer of this invention is generally indicated in FIG. 1 at 10 and comprises an elongated ramp generally indicated at 20 having a floor 30, best seen in FIG. 6, but also seen at 30 in FIG. 1, having a downwardly inclining upper surface 32 which inclines downwardly at an acute angle with respect to the horizontal from an upper end 34 toward its lower end, when the assembly 10 is in a position for unloading and treating cattle, as shown in FIG. 1.

Figure 7:
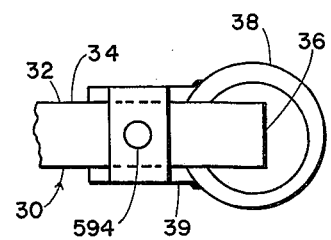
FIG. 7 is a detail showing the upper terminal end of the floor portion of the ramp, but facing in an opposite direction than it is shown in FIG. 5.

The floor 30 has an uppermost end edge 36, best seen in FIG. 7, which latter is substantially enclosed in a slotted pipe 38 attached to the floor by suitable means 39, the pipe 38 forming the uppermost end of the ramp and, in a sense, forming the uppermost end of the floor 30, and being adapted to rest upon the top of the rearward end of the bed, shown in dotted lines at 40, of the truck, shown in dotted lines at 50 in FIG. 4, for supporting the floor 30 and the ramp 20 at its upper end during unloading.

The upper surface 32 of the floor 30 is of a length of at least 11 feet for providing an inclination which is not excessively steep for the unloading of animals from truck beds at times when the lower end of the floor is very close to the ground and is, in fact, substantially at the point indicated at 60 in FIG. 1 during unloading.

The ramp 20 has right and left sidewalls 62 and 64, as seen in FIG. 4, on opposite sides of the floor, and the sidewalls 62 and 64 extend upwardly from the floor 30 a distance sufficiently for safely confining animals while they are being unloaded and treated.

The sidewalls 62 and 64 each comprise a plurality of sidewall uprights which are preferably three in number defined by forward and rearward sidewall uprights 72 and 74 and intermediate uprights 76. Each upright 72, 74 and 76 is pivotally attached at its lower end to the remainder of the ramp by means of bolts 80 which extend horizontally to permit the uprights 72, 74 and 76 to move forwardly and rearwardly as they pivot, keeping in mind that, for reference purposes, the forward end of the chute assembly of this invention is indicated at 100 where there is a trailer hitch 102 attached to the forward end of a tongue 104.

While the uprights shown in FIG. 1 are of a lefthand sidewall of the trailer, yet identical posts are not seen in FIG. 1 because they are directly behind the posts of the left side of the trailer. In fact, the entire sidewall 62 of the right side of the trailer is substantially identical to the sidewall 64 of the left side.

The upper ends of the uprights 72, 74 and 76 are each pivotally attached to an upper sidewall rail 82 by horizontal attachment bolts 84, end ones of which are attached to ears 86 fastened to the end uprights 74 and 84. The sidewalls each comprise intermediate rails 90, which latter are also similarly pivotally attached to the uprights 74 and 76, whereby the uprights and rails of a side can all pivot back and forth for remaining in parallelism with the upper surface 32 of the floor.

An access door generally indicated at 200 is attached in an access opening 210 disposed between the upright 76 and the upright 72 for closing the opening 210, except at times when the door 200 is open so personnel can enter so as to be able to stand behind an animal 220 while the animal is at the lower end of the chute with its neck 224 confined between the confinement bars 230 of a headgate assembly 240 which is disposed at the lower end of the chute assembly 10 as later described.

The door 200 is mounted on the sidewall 64 by hinges 230, which latter are attached to the forward upright 72 of the left sidewall 64. Hinges 230 suitably hold one side member 240 of the door in a manner for remaining vertical, or in other words, in parallelism at all times with the forward upright 72. Remaining parts of the door 200 are likewise so constructed that they have various door uprights 250, all of which are disposed in parallelism with the upright 240 and are each pivotally secured to bottom and top transverse uprights 254 by suitable securing means such as bolts 260 which provide for pivoting on the horizontal axes only.

An anti-sag assembly 280 is attached to the door 200 and prevents its rearward end, or in other words, its terminal end from sagging. The anti-sag assembly 280 has a chain 282 which can be received at any selected one of certain of its links on hook 284 in accordance with the inclination desired for the transverse door members 254 so that they can remain in parallelism with the rails 82 and 90.

The forward end of the chain 282 is secured to the forward upright member 250 of the door.

Each rail 90 is connected by a bolt and ear assembly 290 at each end of each rail 90 to respective sidewall uprights 74 and 76 for the pivoting of the rails 90 about horizontal axes 292 with respect to the uprights 74 and 76.

The ramp 20 is received between the sides of an outer support or support frame generally indicated at 430 and which has lowermost side members 432 on the right and left sides thereof which are restable on a horizontal supporting surface, such as the ground, at times when the ramp floor surface 32 is inclined with respect to the horizontal.

The outer support 430 is provided with a forward pair of posts 440 on the right and left sides of the ramp 20 respectively, and a rearward pair of posts 450 are disposed on the right and left sides of the ramp 20 respectively.

The outer support 430 has a track assembly mounted on the posts 440 and 450 and the track assembly comprises upper and lower vertical slots 490 of the track assembly 500, the slots 490 being disposed on the inner side of the posts 440 and 450 and have upper and lower portions thereof respectively.

The track assembly means 500 further comprises horizontal slots which can be called transverse slots 550 which extend horizontally along the inner side of transverse track members 560, the slots 550 connecting with the slots 490.

Track follower wheels 590 are disposed at four corners of the floor 40, as best illustrated in FIGS. 1A and 6, and are adapted to roll in the posts 440 and 450 at times and at other times to roll in the transverse slotted trackway members 560. Each track follower wheel 590 is connected by an axle 594 to the ramp 20, the axles 594 moving freely laterally of themselves in the slots 490 and 550, whereby the trackway assembly generally indicated at 500 involves all slots described, the posts 440 and 450 and the transverse members 550.

The slots 550 near a post 440 or 450 are spaced apart vertically one above the other and the slots 490 are of a sufficient length that the ramp 20 is permitted to assume the inclination in which its upper surface of its floor 32 is inclined in a position suitable for the unloading of livestock from a truck bed as described earlier in reference to FIG. 4.

Braces 620 are attached to the transverse members 560 and connect them to respective adjacent posts 440 and 450.

Upper ends of the forward posts 440 are interconnected by transverse bar 702 and upper ends of the rearward post 450 are connected by transverse bar 704. Lower ends of the posts 440 and 450 are firmly fixed to the lowermost longitudinal members 432 of the outer support 430.

As best seen in FIG. 2, a pair of hinges interconnect one side of the headgate assembly frame 910 to one of the posts, such as the right rear post 450, as shown in FIG. 2, in a manner whereby the headgate frame 910 can be swung completely around the one side of the trailer to be out of the way at times when it is not in use.

The headgate frame 910 comprises forward members 930 and rearward members 932 disposed on opposite sides of and confining movably the neck confinement bars 230 earlier described, which latter pivot at their lower ends on bolts 950 for rotating about horizontal axes longitudinal of the chute assembly 10 so that the bars 230 can be swung out to the dotted line positions shown in FIG. 3 to release an animal, or swung inward to the full-line position shown in FIG. 3 and locked in such positions by a suitable lock 974 to confine the neck of an animal shown at 224 in FIG. 3.

Referring to FIG. 1, a wheel assembly 1200 is there shown for supporting the outer support 430 during road travel. The wheel assembly 1200 comprises right and left wheel assembly units 1210. The left one of the wheel assembly units is seen in FIGS. 1 and 8, the left wheel assembly unit would be behind it and not visible.

Figure 8:
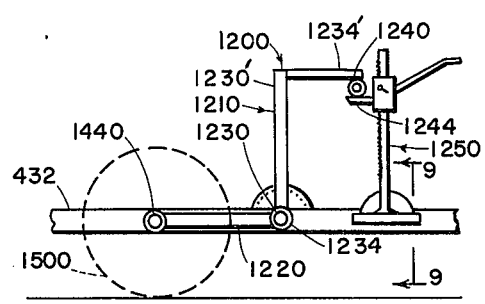
FIG. 8 is a detail showing a portion of the outer support with a wheel attachment and retraction and raising assembly mounted thereon.

The left wheel assembly unit 1210 can be seen in FIG. 8 to comprise a wheel lever 1220 connected to the outer side of a longitudinal member 432 of the outer support 430 by a pivot means 1230 for pivoting about a horizontal axis transverse to the line of draft. The pivot means 1230 comprises a hub 1234 to which latter the lever 1220 is connected and a transverse lever 1230' is also connected to the hub 1234 and extends upwardly and rearwardly therefrom in wheel-storage position in FIG. 1 and vertically therefrom in wheel-down position in FIG. 8.

At the top of the transverse lever 1230' is a jacking arm 1234' parallel to the wheel lever 1220 and having a jack-receiving surface means 1240 on its underside for receiving the lifting portion 1244 of a jack 1250.

Figure 9:
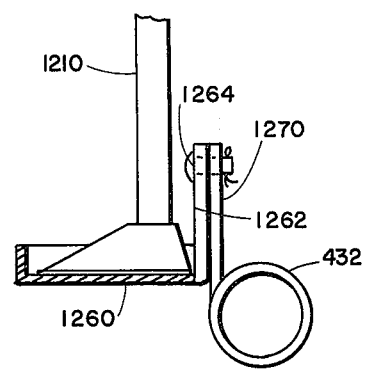
FIG. 9 is a sectional view taken along the line 9—9 of FIG. 8, but not showing the wheel itself.

The jack 1250 is mounted in a jack-supporting platform 1260, seen in FIG. 9, which is suspended downwardly on an arm 1262 from a pivot pin 1264 disposed a substantial distance above the longitudinal member 432, the pin 1264 being supported on a post 1270 which is attached at its lower end to the longitudinal member 432.

As thus described, the jack is adapted to tilt as its platform 1260 tilts. The wheel lever 1220 is connected by an axle 1440 to a wheel 1500.

In operation, the livestock unloading and treating chute assembly 10 of this invention is brought to a desired position for unloading from a truck with ease by using the wheels 1500 of FIG. 8 in the down-position as shown in FIG. 8. Next, the jack 1250 is contracted allowing the wheels to move up into the position shown in FIG. 1. During such contraction, the jack 1250 will tilt and so will the platform 1260.

With the outer support 430 resting on the ground, the jack can be used to raise the ramp 20 until a truck can be backed under the outer end piece 38 of the floor so that the piece 38 rests on the floor, as seen in FIG. 4 for carrying the weight of animals.

Figure 5:
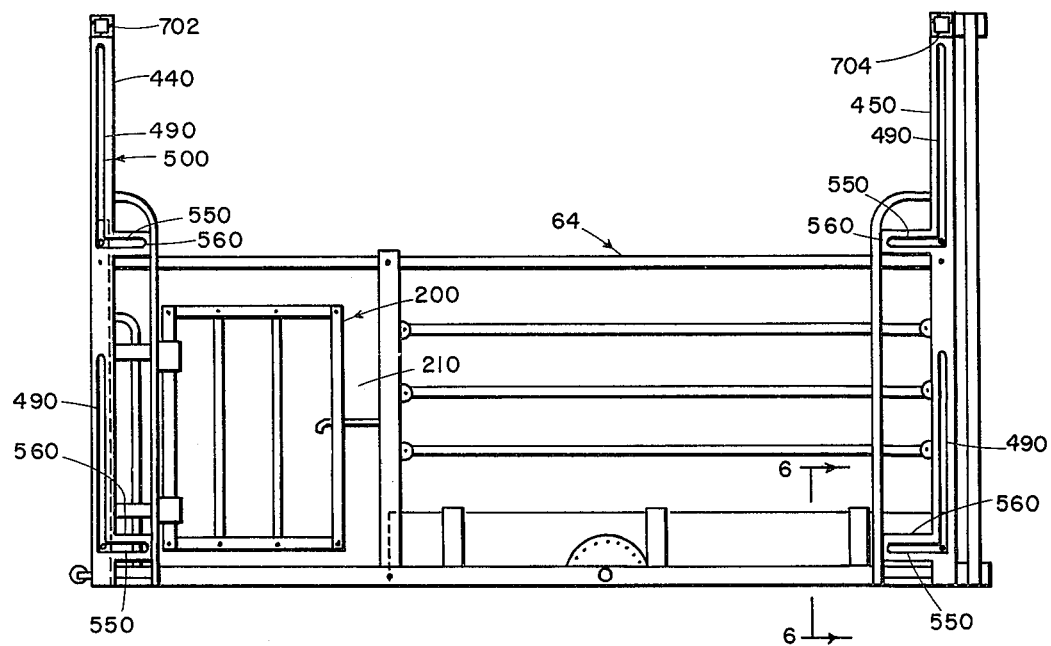
FIG. 5 is a side elevation of the livestock unloading and treatment chute or trailer as seen from the same side as in FIG. 1, but with the ramp part of the livestock unloading and treatment chute assembly being shown in a position with both of its ends lowered such as is best for road travel. The wheel assembly is not shown in FIG. 5. Portions of right side posts and of transverse bars are removed to show slots in left side posts.

During the jacking up of the forward end of the ramp, it will be seen that this movement is permitted by the presence of the transverse slot portions 550, best seen in FIG. 5 at the rear, since the latter allow the axles 594 of the wheels 590, best seen in FIG. 1A, to move forwardly, allowing the ramp to move forwardly at its rearward end as its forward end moves upwardly as made possible by the track slots 490 at the forward end of the outer support 430.

After the ramp has been rested on the truck bed, then animals can be brought one at a time down the ramp and their heads placed so that their necks are confined between the bars 230 of the headgate, whereupon it is then safe, for the first time, for personnel to enter through the access openings 210 to be able to stand on the ramp while treating an animal so confined.

Without the access openings 210 and the doors 200, the operation of treating dozens and dozens of animals would be greatly slowed down because personnel would need to climb over the side rails or sidewalls of the ramp.

As best seen in FIG. 4, the right one of the doors 200 is seen at R, while the left one of the doors 200 is seen at L. The door R is hinged for swinging inwardly and is, therefore, hinged to the right-hand center upright 76, whereas the left-hand door L is hinged as described to the respective sidewall 64 at a point forwardly of the door so that the door L swings outward.

With this construction, the door R can be used to confine an animal so that personnel can freely move through the openings 210 across through from one side of the chute assembly to the other, whereby they need not go all the way around the truck 50, seen in FIG. 4, as would be a slowing down of the operation, necessary if there were not two access doors 200.

The doors L and R both swing 180°, to allow, when tied in the positions shown in FIG. 4, personnel to pass through and also confinement in the chute of the animal being treated and also, when door R is across the ramp, to confine other animals in the truck during unloading and treatment.

Since both the forward and rearward ends of the chute have the respective track portions 550, therefore, it is possible to raise and lower the forward end of the chute, as earlier described, but also it is possible to raise and lower the rearward end of the chute with respect to the outer support 30 so that the chute can be cause to incline in either direction. The advantage of this structure is that many times the chute is located more or less permanently and, in such cases, it will be very convenient for the chute to have the features described because then the chute can be disposed horizontally for treating an animal and the headgate can be used to restrain the animal, but instead of releasing the animal, the animal can be backed out of the back end of the chute into the holding pen. And yet, when loading is desired, the ramp can be raised and the animals can be loaded onto a truck without turning the chute around.

I claim:

1. A livestock trailer for loading, unloading and treating livestock comprising an elongated ramp, right and left wheel means disposed on right and left sides of said ramp as seen from the top, said wheel means having surfaces suitable for engaging public roads for road travel of said trailer, means connecting said wheel means to said ramp whereby said ramp can be transported on said wheel means, said ramp having a floor having an elongated upper surface, said ramp having its upper surface placeable in a certain position downwardly inclining from one of its ends to its other end, said inclination being at an acute angle with respect to the horizontal, said ramp upper surface having a length of at least 11 feet, right and left side wall means attached respectively to said ramp at right and left sides of said upper surface and extending upwardly from said upper surface, when said ramp is in said certain position at least one of said sidewall means having in its upper half an access opening therethrough alongside said inclined ramp surface, access door means openably closing said access opening, said access opening being of a size permitting treatment personnel to pass therethrough for access to said floor so as to be able to stand on said floor to treat an animal standing on said ramp, an openable headgate assembly in upright position at the lower end of said ramp for receiving the neck of an animal standing on said floor, means attaching said headgate assembly to one of said sidewall means.

2. The livestock trailer of claim 1 further having a support frame having lowermost portions disposed in a horizontal plane and restable on a horizontal supporting surface at times when said ramp floor surface is inclined with respect to the horizontal, said support frame comprising two pairs of posts at opposite ends of said ramp respectively, each of said pairs of posts comprising one post on each side of said elongated ramp, said support frame having means slidably supporting the lower end of said ramp in a manner permitting said ramp to move endwise of itself and also to move with respect to said outer support frame so that said ramp while remaining in said outer support frame can be moved to a selected one of various inclinations with respect to said outer support frame while the upper end of said ramp floor remains in a vertical plane.

3. The livestock trailer of claim 2 further comprising a track assembly mounted on said posts, and track follower means attached to said ramp and following in each of said tracks, whereby said tracks guide upward movement of said upper end of said ramp in a vertical plane during said endwise movement of said ramp.

4. The livestock trailer of claim 3 in which said track assembly and said track follower means are disposed at both ends of said chute assembly whereby either end of said ramp can be raised and lowered with respect to said support frame.

5. The livestock trailer of claim 1 further comprising a second access opening in the other of said sidewall means so personnel can go through both of said sidewall means.

6. The livestock trailer of claim 1 further comprising said wheel means being retractably and movably mounted on said support frame and being movable from storage positions in which said wheels do not uphold said outer support frame to wheeling positions in which said wheels do uphold said outer support frame.

7. The trailer of claim 1 having said means connecting said wheel means to said ramp comprising a support frame means to which said wheel means are attached, said support frame means being adapted to operatively correlate with said ramp so as to support said ramp in said certain position, said wheels being adjustably attached to said support frame so as to permit said support frame to engage the ground whereby the weight of said support frame and of said ramp is directly supported by said ground.

8. The livestock trailer of claim 1 having a second access opening in the other of said sidewall means so personnel can go through said sidewalls.

* * * * *